(12) United States Patent
Wang

(10) Patent No.: US 11,399,302 B2
(45) Date of Patent: Jul. 26, 2022

(54) METHOD AND APPARATUS FOR MEASURING CELL

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/347,217

(22) Filed: Jun. 14, 2021

(65) Prior Publication Data

US 2021/0306896 A1  Sep. 30, 2021

Related U.S. Application Data

(63) Continuation of application No. PCT/CN2019/106019, filed on Sep. 16, 2019.

(51) Int. Cl.
*H04W 24/10* (2009.01)
*H04W 76/30* (2018.01)
(Continued)

(52) U.S. Cl.
CPC ........... *H04W 24/10* (2013.01); *H04W 76/16* (2018.02); *H04W 76/27* (2018.02); *H04W 76/30* (2018.02)

(58) Field of Classification Search
CPC ..... H04W 24/10; H04W 76/30; H04W 76/16; H04W 76/27; Y02D 30/70
See application file for complete search history.

(56) References Cited

U.S. PATENT DOCUMENTS

2018/0270682 A1* 9/2018 Zacharias ......... H04W 74/0833
2020/0100128 A1* 3/2020 Fan ..................... H04W 24/10
(Continued)

FOREIGN PATENT DOCUMENTS

| CN | 109309969 A | 2/2019 |
|---|---|---|
| CN | 109803280 A | 5/2019 |

OTHER PUBLICATIONS

3GPP TS 36.331 V16.2.1 (Sep. 2020)—3rd Generation Partnership Project; Technical Specification Group Radio Access Network; Evolved Universal Terrestrial Radio Access (E-UTRA); Radio Resource Control (RRC); Protocol specification (Release 16) (1081 pages).

(Continued)

*Primary Examiner* — Will W Lin
(74) *Attorney, Agent, or Firm* — Perkins Coie LLP

(57) ABSTRACT

Disclosed is a method for measuring a cell. The method includes: a terminal device receiving a first measurement configuration from a first cell, wherein the first measurement configuration is used to configure configuration information for the terminal device to execute measurement in an idle state and/or a deactivated state; and where the current serving cell does not support MR-DC, the terminal device determining not to execute the measurement of a frequency corresponding to a secondary node SN RAT. The terminal device determines, according to whether a first cell and the SN RAT support MR-DC, whether to execute SN RAT-related measurement; if either one of the first cell and SN RAT does not support MR-DC, the terminal device does not measure a frequency point of the SN RAT; and if both the first cell and the SN RAT support MR-DC, the terminal device measures the frequency point of the SN RAT.

10 Claims, 2 Drawing Sheets

(51) Int. Cl.
  *H04W 76/16* (2018.01)
  *H04W 76/27* (2018.01)

(56) References Cited

U.S. PATENT DOCUMENTS

| | | | | |
|---|---|---|---|---|
| 2020/0367085 | A1* | 11/2020 | Hong | H04W 24/10 |
| 2020/0396633 | A1* | 12/2020 | Tseng | H04W 72/0453 |
| 2020/0403743 | A1* | 12/2020 | Bergqvist | H04W 72/046 |
| 2021/0185753 | A1* | 6/2021 | Mattam | H04W 4/14 |
| 2021/0274587 | A1* | 9/2021 | Jung | H04W 76/27 |

OTHER PUBLICATIONS

3GPP TS 38.306 V16.2.0 (Sep. 2020)—3rd Generation Partnership Project; Technical Specification Group Radio Access Network; NR; User Equipment (UE) radio access capabilities (Release 16) (126 pages).

3GPP TS 38.331 V16.2.0 (Sep. 2020)—3rd Generation Partnership Project; Technical Specification Group Radio Access Network; NR; Radio Resource Control (RRC) protocol specification (Release 16) (921 pages).

3GPP TSG-RAN WG2#106—R2-1907254—Reno, Nevada, USA, May 13-17, 2019—Ericsson, FFSs regarding early measurement configurations (4 pages).

International Search Report dated May 26, 2020 of PCT/CN2019/106019 (4 pages).

Extended European Search Report for European Application No. 19946042.9 dated Mar. 21, 2022. 10 pages.

Nokia et al. "Finalizing IDLE mode measurements for euCA" R2-1806772; 3GPP TSG-RAN WG2 Meeting #102; Busan, South Korea; May 21-25, 2018. 7 pages.

Qualcomm Inc. "UE behaviours in NR early measurements" R2-1905543; 3GPP TSG RAN WG2 Meeting #106; Reno, NV, USA; May 13-17, 2019. 7 pages.

First Examination Report dated May 5, 2022 in Indian Application No. 202117039975, 6 pages with English Translation.

* cited by examiner

300
A terminal device receives a first measurement configuration from a first cell, wherein the first measurement configuration is used for configuring configuration information for the terminal device to perform a measurement in an idle state and/or an inactive state —S310
FIG. 3
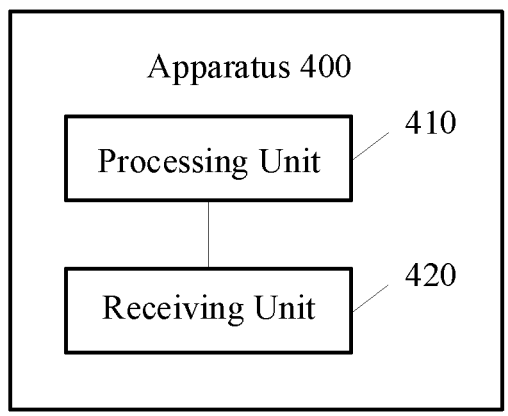
FIG. 4
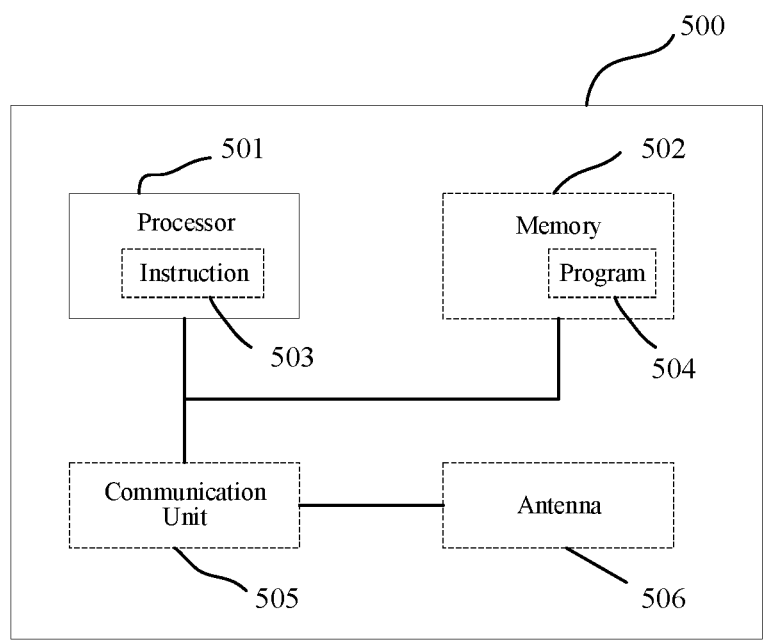
FIG. 5

METHOD AND APPARATUS FOR MEASURING CELL

CROSS-REFERENCE TO RELATED APPLICATION

The present application is a continuation application of International PCT Application No. PCT/CN2019/106019, filed on Sep. 16, 2019, the entire content of which is hereby incorporated by reference.

TECHNICAL FIELD

The present disclosure relate to the field of communication, in particular to a method and an apparatus for measuring a cell.

BACKGROUND

In some cases, a terminal device can use multiple carriers for communication at the same time. For example, in dual connectivity (DC), the terminal device may access a long term evolution (LTE) network and a new radio (NR) network at the same time, communicate with an LTE network device using an LTE carrier, and communicate with an NR network device using an NR carrier.

Before configuring the DC, a cell needs to be measured. A method for measuring a cell is: in an idle state or an inactive state, a terminal device performs measurement and records a measurement result based on measurement parameters configured by a network device, and reports the measurement result to the network device after entering a connected state, so that the network device can configure the DC for the terminal device based on the measurement result.

However, the above method lacks constraint on the terminal device, which will increase the energy consumption of the terminal device in the measurement process in some cases.

SUMMARY

The present disclosure provides a method for measuring a cell, an apparatus, a terminal device, a chip, a computer readable storage medium and a computer program product, which can reduce the energy consumption of the terminal device in some measuring processes.

In a first aspect, a method for measuring a cell is provided, which includes: receiving, by a terminal device, a first measurement configuration from a first cell, wherein the first measurement configuration is used for configuring configuration information for the terminal device performs a measurement in an idle state and/or an inactive state.

In a second aspect, an apparatus for measuring a cell is provided, which may implement the functions corresponding to the method in the first aspect, and the functions may be implemented by hardware or corresponding software executed by hardware. The hardware or software includes one or more units or modules corresponding to the above functions.

In a possible design, the apparatus is a terminal device or a chip. The apparatus may include a processing unit and a transceiving unit. When the apparatus is a terminal device, the processing unit may be a processor and the transceiver unit may be a transceiver. The terminal device may further include a storing unit, which may be a memory. The storing unit is configured to store instructions, and the processing unit executes the instructions stored in the storing unit, enabling the terminal device to execute the method described in the first aspect. When the device is a chip in the terminal device, the processing unit may be a processor, and the transceiver unit may be an input/output interface, pin or circuit, etc. The processing unit executes instructions stored in the storing unit, enabling the terminal device including the chip to execute the method described in the first aspect. The storing unit may be a storing unit in the chip (such as register, cache, etc.) or a storing unit outside the chip in the terminal device (such as read-only memory, random access memory, etc.).

In a third aspect, a computer readable storage medium is provided. A computer program is stored in the computer readable storage medium. When computer program is executed by a processor, the processor is enabled to execute the method described in the first aspect.

In a fourth aspect, a computer program product is provided, which includes computer program codes. When the computer program codes are executed by a processor, the processor is enabled to execute the method described in the first aspect.

In a fifth aspect, a computer program is provided, wherein when the computer program is run on a computer, the computer is enabled to execute the method described in the first aspect.

BRIEF DESCRIPTION OF DRAWINGS

FIG. 3 is a schematic diagram of a method for measuring a cell according to the present disclosure.

FIG. 4 is a schematic diagram of an apparatus for measuring a cell according to the present disclosure.

FIG. 5 is a schematic diagram of a device for measuring a cell according to the present disclosure.

DETAILED DESCRIPTION

In the following, technical solutions in implementations of the present disclosure will be described in combination with accompanying drawings of the implementations of the present disclosure.

Figure 1:
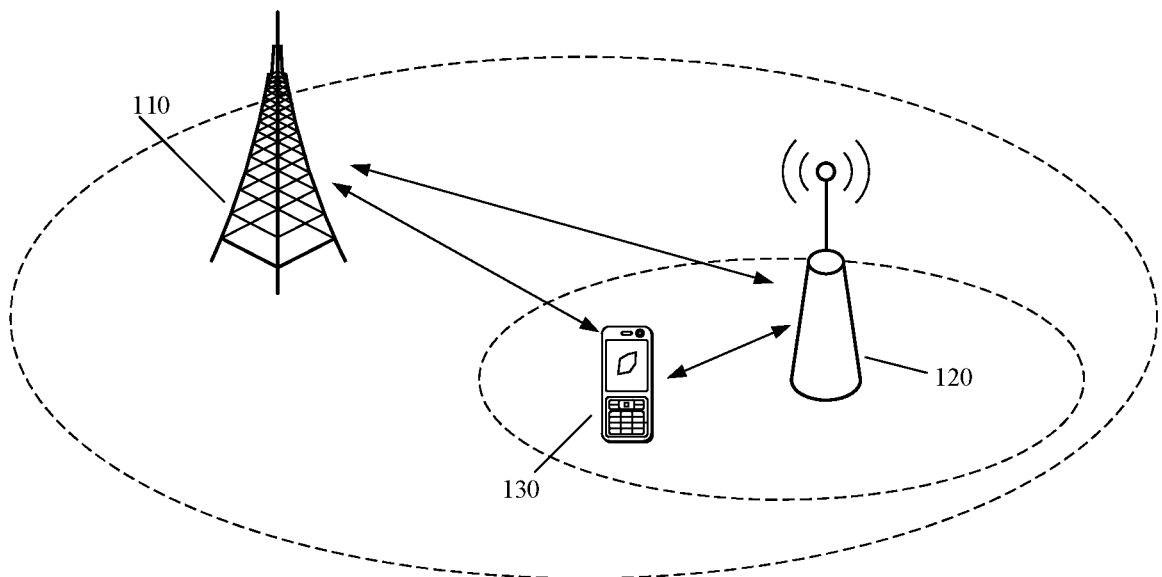
FIG. 1 is a schematic diagram of a communication system applicable to the present disclosure.

FIG. 1 is a schematic diagram of a communication system applicable to the present disclosure.

The communication system 100 includes a network device 110, a network device 120, and a terminal device 130. The terminal device 130 may communicate with the network device 110 and/or the network device 120. In FIG. 1, the dotted line indicates a coverage range of the network device, and the double-headed arrows indicate that two devices can perform a communication between each other. For example, the terminal device 130 may communicate with the network device 110 and/or the network device 120 through electromagnetic waves, and the network device 110 and the network device 120 may also communicate through electromagnetic waves.

In the present disclosure, the terminal device 130 may include various handheld devices, vehicle-mounted devices, wearable devices, computing devices with a wireless communication function or other processing devices connected to wireless modems, such as user equipment (UE) defined by the 3rd generation partnership project (3GPP), mobile station (MS), soft terminals, home gateways, set-top boxes, etc.

The network device 110 and/or the network device 120 may be an access network device conforming to 3GPP specifications, for example, a base station (gNB) in a 5G mobile communication system. The network device 110 and/or the network device 120 may also be non-3gpp network devices, such as access gateways (AGF). The network device 110 and/or the network device 120 may also be relay stations, access points, vehicle-mounted devices, wearable devices and other types of devices.

The communication system 100 is only an example, and the communication system applicable to the present disclosure is not limited thereto.

The terminal device 130 may communicate with the network device 110 and the network device 120 through DC. In a DC, multiple cell groups (CG) may serve the terminal device, wherein the multiple CGs may include a master CG (MCG) and a secondary CG (SCG). The master CG may also be called a master base station. The secondary CG may also be called a secondary base station. In the present disclosure, an MCG, a master base station and a master network device are equivalent. Similarly, a SCG, a secondary base station and a secondary network device are equivalent. The above concepts will not be distinguished below.

The master base station provides a main radio resource control (RRC) control function and a control plane leading to a core network. The secondary base station mainly provides a data transmission function, and may provide a secondary signaling, such as signaling radio bearer (SRB) 3.

Based on factors such as the master base station, the secondary base station and the core network, the DC may be divided into various types.

When the master base station is an LTE base station, the secondary base station is an NR base station and the core network connected with the master base station is an evolved packet core network (EPC), the DC may be called an evolved universal mobile telecommunications system terrestrial radio access network new radio-DC (EN-DC).

When the master base station is an LTE base station, the secondary base station is an NR base station, and the core network connected with the master base station is a next generation core network (NGC), the DC may be called an evolved universal mobile telecommunications system terrestrial radio access network new radio-DC, EN-DC.

When the master base station is an NR base station, the secondary base station is an LTE base station, and the core network connected with the master base station is NGC, the DC may be called a new radio evolved universal mobile telecommunications system terrestrial radio access network-DC (NE-DC).

When the master base station is an NR base station, the secondary base station is an NR base station, and the core network connected with the master base station is NGC, DC may be called an NR-DC.

The above-mentioned DCs are some examples applicable to the present disclosure, and the DCs applicable to the present disclosure are not limited to this.

The terminal device 130 may also communicate with the network device 110 and/or the network device 120 through carrier aggregation (CA).

After the terminal device 130 applies the CA, the communication system may be enabled to support a larger bandwidth by jointly scheduling and using resources on multiple component carriers (CC) so as to be capable of achieving a higher system peak rate. According to the continuity in spectrum of CC, the CA may be divided into continuous CA and discontinuous CA. According to the band where CC is located, the CA may be divided into intra-band CA and inter-band CA.

According to a symmetric relation between uplink and downlink services supported by the communication system, the CA may be divided into asymmetric CA and symmetric CA. In the asymmetric CA, there must be a downlink CC and there may be no uplink CC. There must be a physical downlink control channel (PDCCH) and a physical uplink control channel (PUCCH) for a primary cell component (PCC) cell, and there is PUCCH only in the primary carrier cell. There may be PDCCH in a secondary cell component (SCC) cell.

In a CA, there is only one PCC, and the PCC provides RRC signaling connection and non-access stratum (NAS) functions, etc. Generally, PUCCH only exists on the PCC, and the SCC only provides extra radio resources.

Both the PCC and the SCC are called serving cells. Generally, a maximum number of carriers that may be aggregated in a CA is 5, that is, a maximum bandwidth after aggregation is 100 MHz, and each CC belongs to a same base station. All CCs use a same cell radio network temporary identifier (C-RNTI). The base station ensures that no conflict occurs to the C-RNTI of the cell where each CC is located.

Before configuring CA and DC for the terminal device 130, the terminal device 130 needs to measure the cell, for example, performs a radio resource management (RRM) measurement. In the RRM measurement, a measured signal may be a synchronization signal/physical broadcast channel block (SSB), i.e., a beam measurement result and a cell measurement result may be obtained by measuring a secondary synchronization signal (SSS) in the SSB or a demodulation reference signal (DMRS) of a physical broadcast channel (PBCH). In addition, the terminal device 130 in an RRC connected state may also configure a channel status indicator reference signal (CSI-RS) as a reference signal for the cell measurement.

In an idle state or an inactive state, the terminal device 130 performs the measurement based on measurement parameters configured by the network device and records the measurement result, and reports the measurement result to the network device after entering a connected state to assist a network side to configure CA and DC.

The following describes the above several states first, and then describes the measurement process in the idle state.

Idle state (RRC_IDLE): mobility is a UE-based cell selection and reselection, paging is initiated by a core network (CN), and a paging area is configured by the CN. There is no UE AS context in the base station. There is no RRC connection.

Connected state (RRC_CONNECTED): there is an RRC connection, and there is UE access stratum (AS) context in the base station and UE. Location of the UE known by a network side is a location on a specific cell level. The mobility is controlled by the network side. Unicast data may be transmitted between the UE and the base station.

Inactive state (RRC_INACTIVE): mobility is a UE-based cell selection and reselection, there is a connection between a CN and an NR, there is UE AS context on a certain base station, paging is triggered by RAN, a RAN-based paging area is managed by the RAN, and the location of the UE known by the network side is a location on a RAN-based paging area level.

Figure 2:
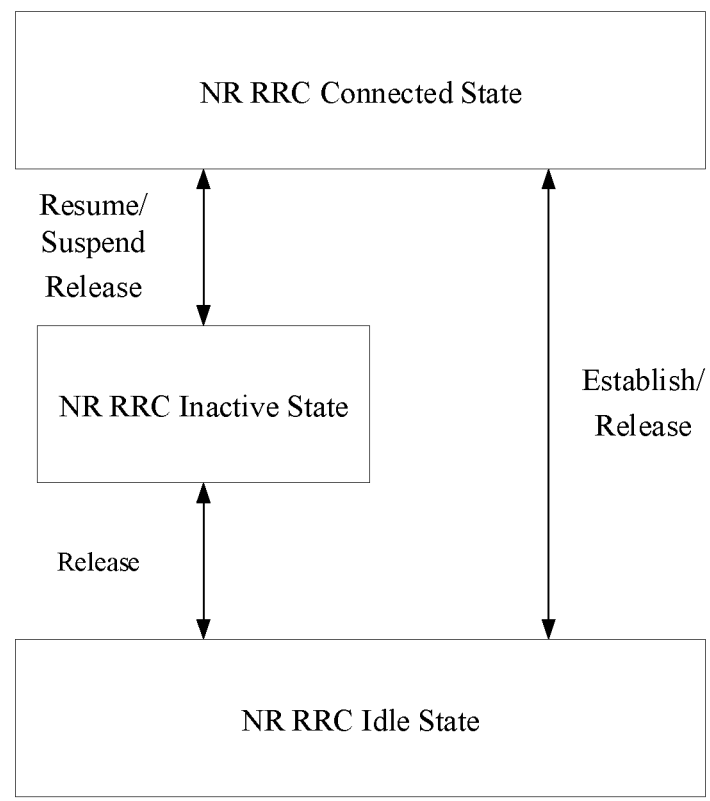
FIG. 2 is a schematic diagram of a state transition of a terminal device.

The network side can control the state transition of the terminal device, as shown in FIG. 2.

When the terminal device is in the inactive state, the terminal device automatically enters the idle state under the following conditions:

when an initial paging message from a CN is received;

a timer T319 is started when an RRC resume request is initiated, and if the timer expires;

when a integrity protection verification of MSG4 fails;

when a cell is reselected to another radio access technology (RAT);

when entering a state of camp on any cell.

Characteristics of the inactive state:

a connection between the radio access network (RAN) and the CN is maintained;

AS context is stored in the UE and at least one gNB;

the UE is reachable to an RAN side, and relevant parameters are configured by the RAN;

the UE does not need to inform the network side when moving in the RAN, but needs to inform the network side when moving out of the RAN; and movement of the UE in the RAN is based on a cell selection and reselection manner.

The measurement process in an idle state is as follows.

An RRC release message may configure the measurement configuration in the idle state, and a system broadcast system information block5 (SIB5) may also configure the measurement configuration in the idle state. If there is a dedicated configuration, the dedicated configuration is used, otherwise the measurement configuration in the SIB5 is used. There is no valid time limit for the measurement configuration in the idle state in the SIB5. The measurement configuration in the idle state configured in a dedicated signaling is also configured with a valid time configuration, namely T331. If T331 times out or stops, the measurement configuration in the idle state configured in the dedicated signaling will be released. Whether the UE continues to use the measurement configuration the idle state in the SIB5 depends on the implementation of the UE.

After obtaining the measurement configuration in the idle state, the UE performs a measurement, indicates that there is a measurement result of the idle state on the network side in a uplink (UL) message, and then reports the measurement result of the idle state based on a request mode of a base station. At the same time, the cell will also broadcast whether the reporting of the measurement result of the idle state is supported in the SIB2.

Measurement configuration information for the idle state is as follows:

Both the SIB5 and the dedicated signaling include measIdleCarrierListEUTRA, wherein measIdleCarrierListEUTRA includes carrierFreq, allowedMeasBandwidth, validityArea, measCellList, reportQuantities and qualityThreshold.

CarrierFreq and allowedMeasBandwidth indicate measured frequency point and measuring bandwidth. ValidityArea configures a valid range of the measurement configuration in the idle state and is a cell list. If the UE reselects to a cell outside the validityArea, the timer T331 is stopped. MeasCellList gives cells whose measurement configuration is reported, and other cells do not need to be reported. If measCellList is not configured, the UE reports the measurement reports of at most maxCellMeasIdle cells that meet the qualityThreshold. Reported measurement quantity is specified by reportQuantities.

The following describes a method for measuring a cell provided by the present disclosure. As shown in FIG. 3, the method 300 includes:

S310, a terminal device receives a first measurement configuration from a first cell, wherein the first measurement configuration is used for configuring configuration information for the terminal device to perform a measurement in an idle state and/or an inactive state.

Optionally, the first measurement configuration is carried in a dedicated signaling, wherein the dedicated signaling is a radio resource control release (RRCRelease) message.

Optionally, the first measurement configuration is carried in system broadcast.

Optionally, the method 300 further includes:

In case that the first cell does not support multi-RAT DC (MR-DC), the terminal device determines not to perform a measurement of a frequency corresponding to a secondary node (SN) RAT.

Optionally, the method 300 further includes:

In case that the first cell supports MR-DC, the terminal device performs a measurement of the first measurement configuration.

The first cell is, for example, a current serving cell, wherein the current serving cell is, for example, an LTE cell. The SN RAT is, for example, an NR RAT. Optionally, the current serving cell may also be an NR cell.

If the system broadcast of the current serving cell indicates that the LTE cell supports the EN-DC, for example, upperLayerIndication indicates true, the UE acquires a measurement of NR frequency point in an NR frequency list in SIB, otherwise the UE does not acquire measurement configuration information of the SN RAT.

If the system broadcast of the current cell indicates that the current LTE cell supports the EN-DC, for example, upperLayerIndication indicates true, the UE performs the measurement of the NR frequency point in the NR frequency list, otherwise, the UE does not perform a measurement of an early measurement of any NR frequency point or a reporting of the measurement result.

In the above solution, the terminal device determines whether to perform a measurement related to the SN RAT according to whether the current serving cell and the SN RAT support MR-DC. If either of the current serving cell or the SN RAT does not support MR-DC, the terminal device does not measure the frequency point of the SN RAT. If the current serving cell and the SN RAT both support MR-DC, the terminal device measures the frequency point of the SN RAT. The above solution can prevent the terminal device from doing useless work and achieve an effect of saving electricity.

Optionally, when the RAT of a second cell is different from the RAT of the first cell, the terminal device determines not to perform a measurement related to the second cell; or, when the RAT of the second cell is the same as the RAT of the first cell, the terminal device performs the measurement related to the second cell.

Optionally, when the RAT of the second cell is different from the RAT of the first cell, and when the RAT of the second cell is a non-new radio (NR) RAT and/or a non-LTE RAT, the terminal device determines not to perform the measurement related to the second cell; or, when the RAT of the second cell is different from the RAT of the first cell, and when the RAT of the second cell is an NR RAT and/or an LTE RAT, or, when the RAT of the second cell is the same as RAT of a third cell, the terminal device performs the measurement related to the second cell.

Optionally, the RAT of the first cell is an RAT to which a cell configuring the terminal device to measure belongs, the RAT of the second cell is an RAT to which a serving cell where the terminal device is located when performing the measurement belongs, and the RAT of the third cell is an RAT to which a secondary cell group forming MR-DC with the RAT of the first cell belongs.

The first cell is, for example, a current serving cell, and the second cell is, for example, a reselected cell. In the above solution, the terminal device determines whether to perform the measurement related to the second cell according to an RAT of the reselected second cell. If either of the current serving cell or the reselected cell does not support MR-DC, the terminal device does not measure the frequency point of the reselected cell. If the current serving cell and the reselected cell both support MR-DC, the terminal device measures the frequency point of the reselected cell. The above solution can prevent the terminal device from doing useless work and achieve the effect of saving electricity.

Optionally, the dedicated signaling received by the terminal device indicates a first cell information, wherein the first cell information includes cell frequency point information and/or cell identification information.

Optionally, the terminal device searches for a cell according to the first cell information and camps on the cell.

Optionally, after exiting the radio resource control (RRC) connected state, the terminal device receives system broadcast information in the last serving cell, and then performs a cell selection.

Optionally, after exiting the RRC connected state, the terminal device camps on the last serving cell, the current cell does not broadcast configuration information related to earlymeasurement, and the terminal device determines not to initiate system information (SI) request, wherein the SI request is used for requesting the network device to send configuration information.

In the above solution, the measurement configuration acquired by the terminal device from the RRC release message is incomplete, and it is necessary to read the configuration information in the system broadcast to improve the measurement configuration. The terminal device may actively send an SI request to acquire frequency point information and/or cell identification information of a camping cell, and the network device may send the frequency point information and/or the cell identification information of the camping cell to the terminal device through a dedicated signaling, so as to facilitate the terminal device to improve the measurement configuration. The terminal device does not need to measure blindly, thus achieving the effect of saving electricity. Or, after entering the idle state or the inactive state, the terminal device preferentially camps on the current serving cell, acquires the measurement result, and then executes the cell selection. The terminal device does not need to send the SI request, which reduces signaling overhead and achieves the effect of saving electricity. Or, after entering the idle state or the inactive state, the terminal device camps on the last serving cell, and the current cell does not broadcast the configuration information related to earlymeasurement. The terminal device determines not to initiate the SI request, and waits for the network device to actively send an SIB related to earlymeasurement configuration information before or after the RRC release, thus achieving the effect of saving electricity.

The example of the method for measuring a cell provided by the present disclosure is described in detail above. It may be understood that in order to achieve the above functions, an apparatus for measuring a cell includes corresponding hardware structures and/or software modules for performing each function. Those skilled in the art may easily understand that in connection with the units and algorithm actions of the examples described in the implementations disclosed herein, the present disclosure may be implemented in a form of hardware or a combination of the hardware and computer software. Whether a function is performed in a form of hardware or computer software driving hardware depends on a particular application and a design constraint condition of the technical solution. A skilled person may use various methods to implement the described functions for each particular application, but such implementation should not be considered to be beyond the scope of the present disclosure.

Division for functional units may be performed on the apparatus for measuring a cell according to the above method examples in the present disclosure. For example, various functions may be divided into various functional units, or two or more functions may be integrated into one processing unit. The above integrated unit may be implemented in a form of hardware, or may be implemented in a form of software function unit. It should be noted that, the division of the units in the present disclosure is illustrative, and is merely the division of logical functions. Other division modes may be used in actual implementations.

FIG. 4 is a schematic diagram of a structure of an apparatus for measuring a cell according to the present disclosure. The apparatus 400 includes a processing unit 410 and a receiving unit 420. The receiving unit 420 can perform a receiving act under the control of the processing unit 410.

The receiving unit 420 may perform: receiving a first measurement configuration from a first cell, wherein the first measurement configuration is used for configuring configuration information for the apparatus to perform a measurement in an idle state and/or an inactive state.

Optionally, the first measurement configuration is carried in a dedicated signaling.

Optionally, the dedicated signaling is an RRCRelease message.

Optionally, the first measurement configuration is carried in system broadcast.

Optionally, the processing unit 410 is further configured to determine not to perform a frequency measurement corresponding to an SN RAT when the first cell does not support MR-DC.

Optionally, the processing unit 410 is specifically configured to determine not to acquire the measurement configuration information of the SN RAT.

Optionally, the processing unit 410 is further configured to perform a measurement of the first measurement configuration when the first cell supports MR-DC.

Optionally, the apparatus 400 further includes a sending unit, and the processing unit 410 is specifically configured to control the sending unit to perform: sending a request message, wherein the request message requests to acquire measurement configuration information of SN RAT.

Optionally, the first cell is a current serving cell.

Optionally, the current serving cell is an LTE cell or an NR cell.

Optionally, the processing unit 410 is further configured to determine not to perform a measurement related to a second cell when RAT of the second cell is different from the RAT of the first cell; or, perform the measurement related to the second cell when the RAT of the second cell is the same as the RAT of the first cell.

Optionally, the processing unit 410 is further configured to determine not to perform a measurement related to the second cell when the RAT of the second cell is different from the RAT of the first cell and when the RAT of the second cell is a non-NR RAT and/or a non-LTE RAT; or, perform a measurement related to the second cell when the RAT of the second cell is different from the RAT of the first cell and when the RAT of the second cell is an NR RAT and/or LTE RAT; or, perform a measurement related to the second cell when the RAT of the second cell is the same as RAT of a third cell.

Optionally, the RAT of the first cell is an RAT to which a cell configuring the apparatus to measure belongs, the RAT of the second cell is an RAT of a serving cell where the device is located when performing the measurement, and the RAT of the third cell is an RAT of a secondary cell group which forms MR-DC with the RAT of the first cell.

Optionally, the dedicated signaling indicates first cell information, wherein the first cell information includes cell frequency point information and/or cell identification information.

Optionally, the processing unit 410 is further configured to search for a cell and camp on the cell according to the first cell information.

Optionally, the processing unit 410 is further configured to receive system broadcast information in a last serving cell after the apparatus exits an RRC connected state, and then perform a cell selection.

Optionally, the processing unit 410 is further configured to: camp on the last serving cell after the device apparatus the RRC connected state, wherein the current cell does not broadcast configuration information related to earlymeasurement, and determine not to initiate a system information (SI) request, wherein the SI request is used for requesting the network device to send configuration information.

FIG. 5 shows a schematic diagram of a structure of a device for measuring a cell according to the present disclosure. The dashed line in FIG. 5 indicates that the unit or the module is optional. A device 500 may be configured to implement the method described in the above method implementations. The device 500 may be a terminal device or a chip.

The device 500 includes one or more processors 501, the one or more processors 501 may support the device 500 to implement the method in the method implementation corresponding to FIG. 3. The processor 501 may be a general purpose processor or a special purpose processor. For example, the processor 501 may be a central processing unit (CPU). The CPU may be configured to control the device 500, execute software programs, and process data of the software programs. The device 500 may further include a communication unit 505 configured to implement input (reception) and output (transmission) of signals.

For example, the device 500 may be a chip, and the communication unit 505 may be an input and/or output circuit of the chip, or the communication unit 505 may be a communication interface of the chip, which may be a component of a terminal device or a network device or other wireless communication devices.

For another example, the device 500 may be a terminal device, and the communication unit 505 may be a transceiver of the terminal device, or the communication unit 505 may be a transceiver circuit of the terminal device.

The device 500 may include one or more memories 502 on which a program 504 is stored, wherein the program 504 may be executed by the processor 501 to generate an instruction 503, enabling the processor 501 to execute the method described in the above method implementations according to the instruction 503. Optionally, data may also be stored in the memory 502. Optionally, the processor 501 may also read data stored in the memory 502, wherein the data may be stored at a same storage address as the program 504, or at a different storage address from the program 504.

The processor 501 and the memory 502 may be arranged separately or integrated together, for example, they may be integrated on a system on chip (SOC) of a terminal device.

The device 500 may also include an antenna 506. The communication unit 505 is configured to implement a transceiving function of the device 500 by the antenna 506.

The specific manner in which the device 500 executes the method of measuring a cell may be referred to the related description in the method implementation.

In an implementation process, each step of the foregoing method implementations may be implemented by an integrated logic circuit in a form of hardware in the processor 501 or instructions in a form of software. The processor 501 may be a CPU, a digital signal processor (DSP), an application specific integrated circuit (ASIC), a field programmable gate array (FPGA), or another programmable logic device, such as discrete gate, transistor logic device, or discrete hardware component.

The present disclosure further provides a computer program product which, when executed by the processor 501, implements the method described in any of the method implementations in the present disclosure.

The computer program product may be stored in the memory 502, for example, the computer program may be a program 504. The program 504 is finally converted into an executable object file that can be executed by the processor 501 after subjected to processing procedures such as preprocessing, compiling, assembling and linking.

The present disclosure further provides a computer readable storage medium, on which a computer program is stored, and when the computer program is executed by a computer, the method described in any method implementation in the present disclosure is implemented. The computer program may be a high-level language program or an executable object program.

The computer readable storage medium, for example, is the memory 502. The memory 502 may be volatile memory or nonvolatile memory, or the memory 502 may include both volatile memory and nonvolatile memory at the same time. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache. By illustration of example but not restriction, a RAM is available in many forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

Those skilled in the art can clearly understand that for the convenience and conciseness of description, the specific working processes and technical effects of the above-described devices and equipment can refer to the corresponding processes and technical effects in the above-mentioned method implementations, and will not be described in detail here.

In several implementations provided by the present disclosure, it should be understood that the disclosed systems, apparatuses and methods may be implemented in other ways. For example, some features of the method implementations described above may be ignored or not performed. For example, the apparatus implementations described above are only illustrative, for example, the division of the units is only a logical function division, and there may be other division manners in actual implementation. For example, multiple units or components may be combined or integrated into another system. In addition, the coupling between units or components can be direct coupling or indirect coupling, which includes electrical, mechanical or other forms of connection.

It should be understood that in various implementations of the present disclosure, order of serial numbers of the foregoing processes do not mean an order of execution. The order of execution of the processes should be determined according to functions and internal logics of the processes, and should not impose any limitation on implementation mode processes of the implementations of the present disclosure.

In addition, the terms "system" and "network" are often used interchangeably herein. The term "and/or" in this document is merely an association relation describing associated objects, indicating that there may be three relations, for example, A and/or B may indicate three cases: A alone, A and B, and B alone. In addition, the symbol "/" in this document generally indicates that objects before and after the symbol "/" have an "or" relationship.

In general, the above descriptions are only preferred implementations of the present disclosure and are not intended to limit the protection scope of the present disclosure. Any modification, equivalent substitution, improvement, etc. made within the spirit and principle of the present disclosure shall be included in the protection scope of the present disclosure.

What is claimed is:

1. A method for measuring a cell, comprising:
   receiving, by a terminal device, a first measurement configuration from a first cell, wherein the first measurement configuration is used for configuring configuration information for the terminal device to perform a measurement in an idle state and/or an inactive state; and
   determining, by the terminal device, not to perform a measurement related to a second cell when an RAT of the second cell is different from an RAT of the first cell; or,
   performing, by the terminal device, the measurement related to the second cell when the RAT of the second cell is different from the RAT of the first cell, or when the RAT of the second cell is the same as an RAT of a third cell,
   wherein the RAT of the first cell is an RAT to which a cell configuring the terminal device to measure belongs, the RAT of the second cell is an RAT to which a serving cell where the terminal device is located when performing the measurement belongs, and the RAT of the third cell is an RAT to which a secondary cell group forming multi-radio access technology dual-connection (multi-RAT DC, MR-DC) with the RAT of the first cell belongs.

2. The method of claim 1, wherein the first measurement configuration is carried in a dedicated signaling.

3. The method of claim 2, wherein the dedicated signaling is a radio resource control release (RRCRelease) message.

4. The method of claim 1, wherein the first measurement configuration is carried in system broadcast.

5. The method of claim 1, further comprising:
   determining, by the terminal device, not to perform a measurement of a frequency corresponding to a secondary node (SN) radio access technology (RAT) when the first cell does not support multi-radio access technology dual-connection (MR-DC).

6. An apparatus for measuring a cell, comprising a processor and a transceiver, wherein the processor is configured to control the transceiver to:
   receive a first measurement configuration from a first cell, wherein the first measurement configuration is used for configuring configuration information for the apparatus to perform a measurement in an idle state and/or an inactive state; and
   determine not to perform a measurement related to a second cell when an RAT of the second cell is different from an RAT of the first cell; or,
   perform the measurement related to the second cell when the RAT of the second cell is different from the RAT of the first cell, or when the RAT of the second cell is the same as an RAT of a third cell,
   wherein the RAT of the first cell is an RAT to which a cell configuring the apparatus to measure belongs, the RAT of the second cell is an RAT to which a serving cell where a device is located when performing the measurement belongs, and the RAT of the third cell is an RAT to which a secondary cell group forming multi-radio access technology dual-connection (multi-RAT DC, MR-DC) with the RAT of the first cell belongs.

7. The apparatus of claim 6, wherein the first measurement configuration is carried in a dedicated signaling.

8. The apparatus of claim 7, wherein the dedicated signaling is a radio resource control release (RRCRelease) message.

9. The apparatus of claim 6, wherein the first measurement configuration is carried in system broadcast.

10. The apparatus of claim 6, wherein the processor is further configured to:
    determine not to perform a measurement of a frequency corresponding to a secondary node (SN) radio access technology (RAT) when the first cell does not support multi-radio access technology dual-connection (MR-DC).

* * * * *